(12) United States Patent
Yoshida et al.

(10) Patent No.: US 10,466,482 B2
(45) Date of Patent: Nov. 5, 2019

(54) OPTICAL ELEMENT AND DISPLAY DEVICE

(71) Applicant: SEIKO EPSON CORPORATION, Tokyo (JP)

(72) Inventors: Shohei Yoshida, Shimosuwa-machi (JP); Hayato Matsuki, Suwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 23 days.

(21) Appl. No.: 15/703,642

(22) Filed: Sep. 13, 2017

(65) Prior Publication Data

US 2018/0081177 A1  Mar. 22, 2018

(30) Foreign Application Priority Data

Sep. 21, 2016  (JP) ................. 2016-183847

(51) Int. Cl.
*G02B 27/01* (2006.01)
*G02B 27/14* (2006.01)
*G02B 27/28* (2006.01)

(52) U.S. Cl.
CPC ....... *G02B 27/0172* (2013.01); *G02B 27/145* (2013.01); *G02B 27/283* (2013.01);
(Continued)

(58) Field of Classification Search
CPC .. G02B 27/01; G02B 27/0101; G02B 27/017; G02B 27/1072; G02B 27/14;
(Continued)

(56) References Cited

U.S. PATENT DOCUMENTS

| 2008/0151379 A1* | 6/2008 | Amitai ................. G02B 6/0055 359/630 |
| 2009/0015929 A1* | 1/2009 | DeJong .............. G02B 27/0081 359/633 |

(Continued)

FOREIGN PATENT DOCUMENTS

| JP | 4609160 B2 | 1/2011 |
| JP | 2012-008356 A | 1/2012 |

(Continued)

*Primary Examiner* — Stephone B Allen
*Assistant Examiner* — Adam W Booher
(74) *Attorney, Agent, or Firm* — Oliff PLC

(57) ABSTRACT

An optical element includes partially reflecting mirrors provided in parallel to each other with an interval therebetween, reflect a part of image light and external light, and transmit another part of the image light and the external light; and a transmitting member interposed between adjacent two partially reflecting mirrors of the partially reflecting mirrors. The light-transmissive member includes an incidence surface on which the image light and the external light are incident and an exit surface from which the image light and the external light are exited. Each of the partially reflecting mirrors is disposed to be inclined with respect to the incidence surface and the exit surface. The partially reflecting mirrors include at least one first partially reflecting mirror and at least one second partially reflecting mirror having different reflectances with respect to predetermined polarized light components included in the image light and the external light.

7 Claims, 13 Drawing Sheets

(52) U.S. Cl.
CPC .. *G02B 2027/011* (2013.01); *G02B 2027/012* (2013.01); *G02B 2027/0125* (2013.01)

(58) Field of Classification Search
CPC .... G02B 27/145; G02B 27/28; G02B 27/283; G02B 27/285; G02B 2027/011; G02B 2027/012; G02B 2027/0121; G02B 2027/0123; G02B 2027/0125
See application file for complete search history.

(56) References Cited

U.S. PATENT DOCUMENTS

2011/0317233 A1  12/2011  Hayashibe et al.
2013/0163089 A1   6/2013  Bohn

FOREIGN PATENT DOCUMENTS

| JP | 5817904 B1 | 11/2015 |
| WO | 2005/088384 A1 | 9/2005 |
| WO | 2005/111669 A1 | 11/2005 |
| WO | 2016/088389 A1 | 6/2016 |

* cited by examiner

OPTICAL ELEMENT AND DISPLAY DEVICE

BACKGROUND

1. Technical Field

The present disclosure relates to an optical element and a display device.

2. Related Art

Recently, an image display device such as a head-mounted display, which is used by being worn on the head of an observer, is provided as one of wearable information devices. There is also known an image display device capable of simultaneously and visually recognizing both an image generated by a display element and an external image when the observer wears the image display device, that is, a so-called see-through type image display device.

JP-A-2012-008356 describes an image display device that includes a light source and scanning means including a first mirror, first light deflection means, a second mirror, and second light deflection means, and that guides light exited from the second light deflection means to the eye of the observer. JP-A-2012-008356 describes that each of a plurality of partially-transmitting films configuring the second light deflection means reflects either S-polarized light components or P-polarized light components and transmits the other polarized light components.

International Publication No. 2005/088384 describes an image display device including an image display optical system that includes a plate with light transmittance and a deflection optical portion configured by multiple mirrors. International Publication No. 2005/088384 describes that the multiple mirrors include a plurality of micro reflection surfaces inclined with respect to a normal of the plate, and that a micro reflection surface is optimally designed in accordance with a polarized light state of incident light.

The image display devices described in JP-A-2012-008356 and International Publication No. 2005/088384 are based on the assumption that all the partially-transmitting films or all the micro reflection surfaces have the same reflection characteristics. The image display devices have problems that striped unevenness is viewed on a display image due to a plurality of partially-transmitting film patterns or stripe patterns of the multiple mirrors, a phenomenon (ghost) in which an external image is dually viewed occurs, and the like.

SUMMARY

An advantage of some aspects of the embodiment is to provide a display device which can reduce viewing of striped unevenness. Alternatively, another advantage of some aspects of the embodiment is to provide a display device which can reduce dually viewing of an external image. In addition, still another advantage of some aspects of the embodiment is to provide an optical element which is optimally used for a light exit portion of the display device.

According to an aspect of the embodiment, there is provided an optical element including a plurality of partially reflecting mirrors that are provided in parallel to each other with an interval therebetween, reflect a part of image light and external light, and transmit another part of the image light and the external light; and a light-transmissive member that is interposed between adjacent two partially reflecting mirrors of the plurality of partially reflecting mirrors. The transmitting member includes an incidence surface on which the image light and the external light are incident and an exit surface from which the image light and the external light are exited. Each of the plurality of partially reflecting mirrors is disposed so as to be inclined with respect to the incidence surface and the exit surface. The plurality of partially reflecting mirrors include at least one first partially reflecting mirror and at least one second partially reflecting mirror that have different reflectances with respect to predetermined polarized light components which are included in the image light and the external light.

The optical element according to the aspect of the embodiment includes a plurality of partially reflecting mirrors including at least one first partially reflecting mirror and at least one second partially reflecting mirror which have different reflectances with respect to predetermined polarized light components. Accordingly, when the image light is incident on and exited from the first partially reflecting mirror and the second partially reflecting mirror, the optical element according to the aspect of the embodiment can reduce an intensity difference between reflected lights which are exited from the partially reflecting mirror more than a case of an optical element in the related art including a plurality of partially reflecting mirrors having the same reflectance. Thereby, it is possible to reduce viewing of striped unevenness.

The optical element according to the aspect of the embodiment includes a plurality of partially reflecting mirrors including at least one first partially reflecting mirror and at least one second partially reflecting mirror that have different reflectances with respect to predetermined polarized light components. Accordingly, the optical element according to the aspect of the embodiment can reduce intensity of external light reflected by the second partially reflecting mirror after being reflected by the first partially reflecting mirror more than an optical element in the related art including a plurality of partially reflecting mirrors having the same reflectance. Thereby, it is possible to reduce double viewing of an external image.

BRIEF DESCRIPTION OF THE DRAWINGS

The embodiment will be described with reference to the accompanying drawings, wherein like numbers reference like elements.

DESCRIPTION OF EXEMPLARY EMBODIMENTS

Hereinafter, an embodiment will be described with reference to the drawings.

A display device according to the present embodiment is used as, for example, a head-mounted display used by being worn on the head of an observer.

Figure 1:
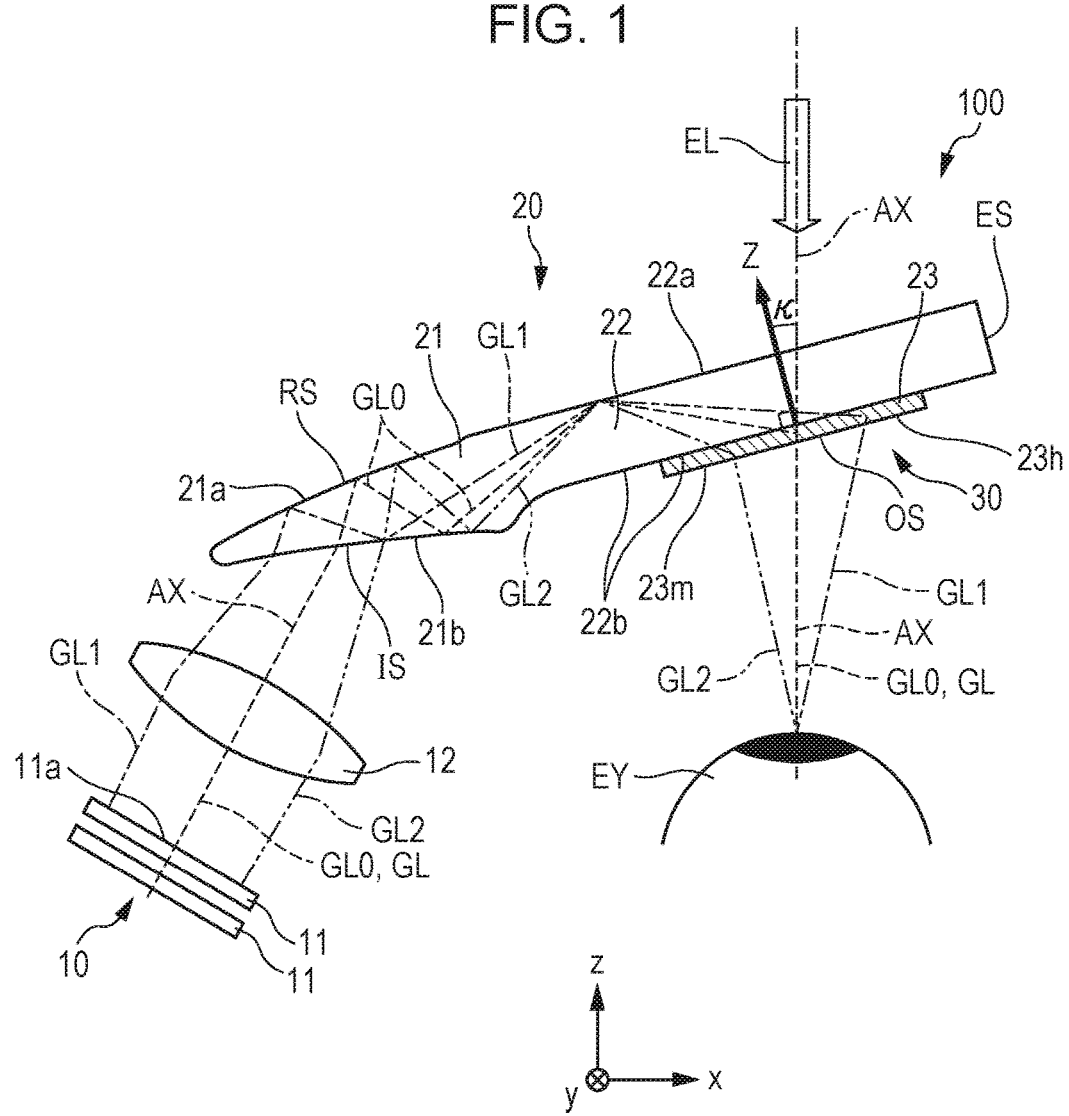
FIG. 1 is a plan view of a display device according to an embodiment.
Figure 2:
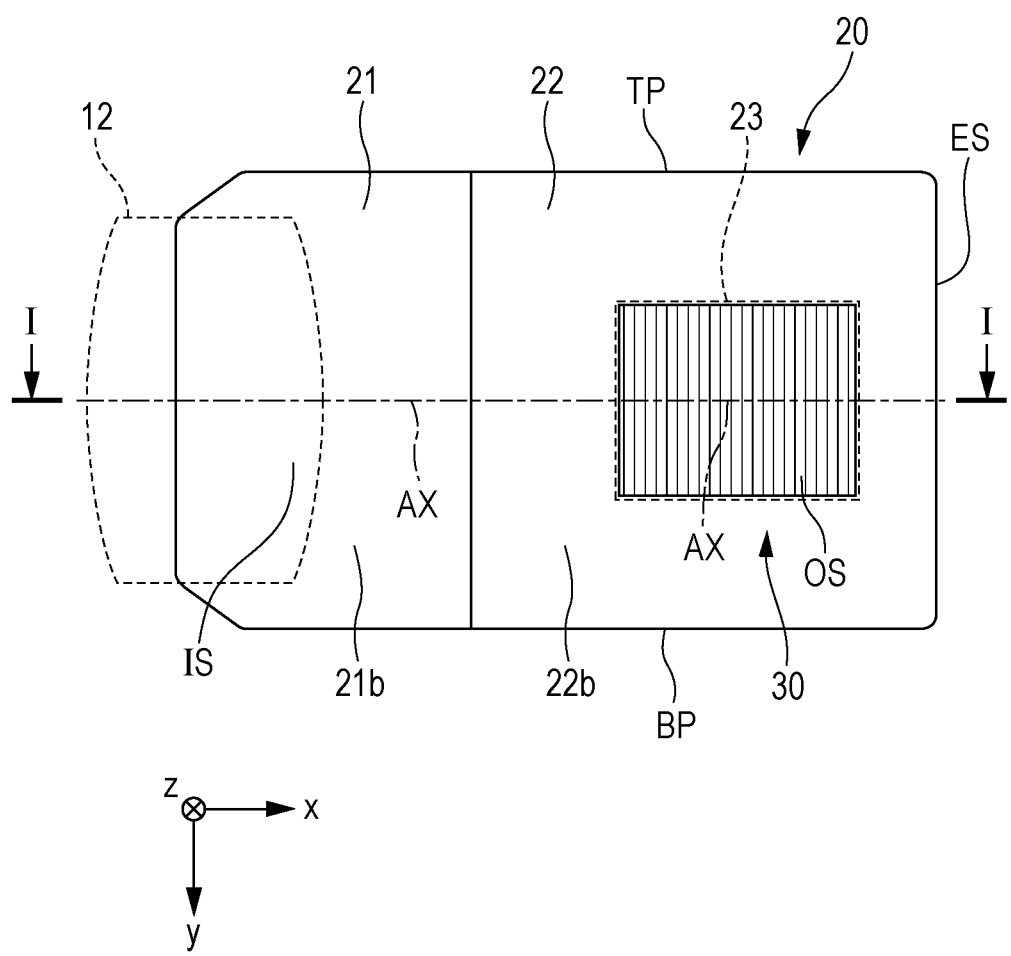
FIG. 2 is a rear view of a light guiding device viewed from an observer side.
Figure 3:
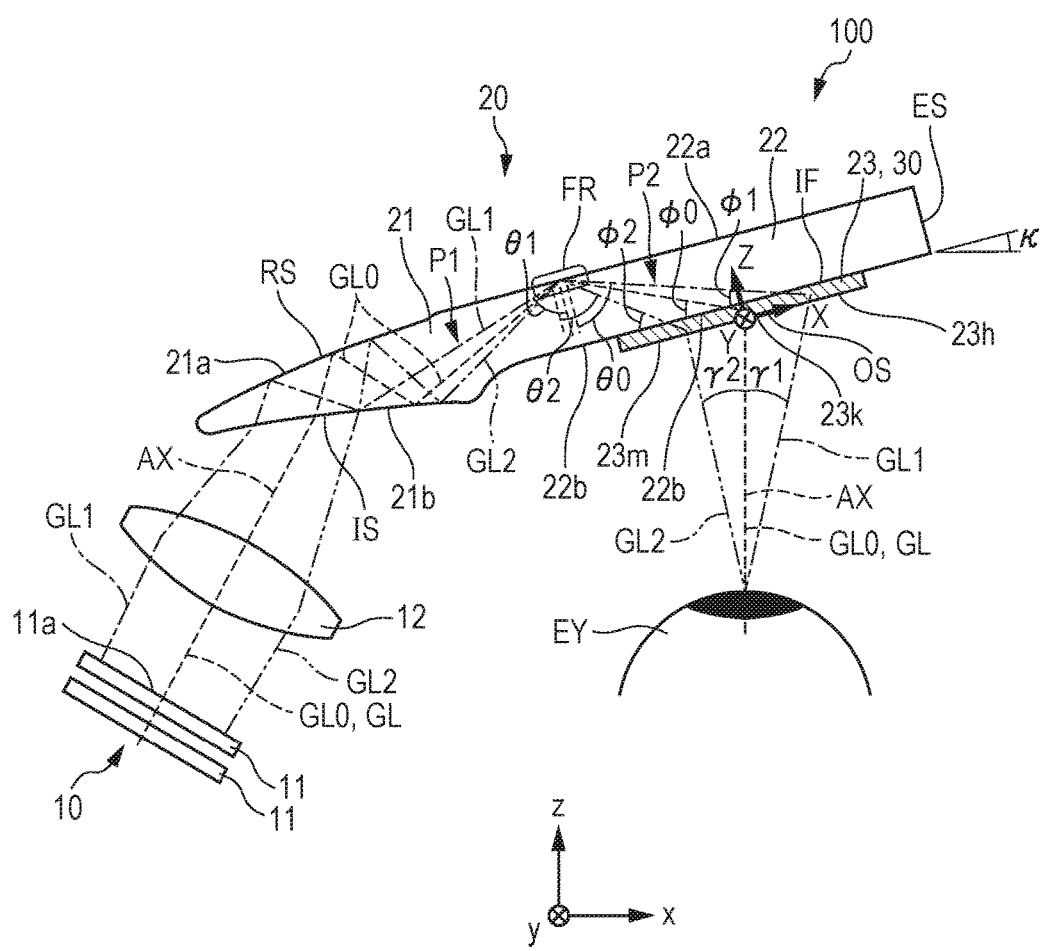
FIG. 3 is a view illustrating a light path of image light in the light guiding device.

FIG. 1 is a plan view of the display device according to the embodiment. FIG. 2 is a rear view of a light guiding device viewed from an observer side. FIG. 3 is a view illustrating a light path of image light in the light guiding device.

In the following drawings, scales of dimensions may be changed by configuration elements so as to make each configuration element be easily viewed.

Overall Configuration of Light Guiding Device and Display Device

As illustrated in FIG. 1, the display device 100 includes an image forming device 10 and a light guiding device 20. FIG. 1 corresponds to a cross section I-I of the light guiding device 20 illustrated in FIG. 2.

The display device 100 allows the observer to view an image formed by the image forming device 10 as a virtual image and allows an observer to observe an external image in a see-through manner. The display device 100 includes the image forming device 10 and the light guiding device 20 which are provided by one pair in correspondence with the right eye and the left eye of the observer. A device for the right eye and a device for the left eye are bilaterally symmetrical in disposition and configurations thereof are the same. Accordingly, only the device for the left eye is illustrated, and illustration of the device for the right eye is omitted here. The display device 100 has an appearance like, for example, eyeglasses as a whole.

The image forming device 10 includes an organic electroluminescence (EL) element 11 and a projection lens 12. The organic EL element 11 exits image light GL forming an image such as a moving image and a still image. The projection lens 12 is configured with a collimator lens which converts the image light GL exited from each point on the organic EL element 11 into substantially parallel rays. The projection lens 12 is formed of glass or plastic, and is not limited to one piece, and may be configured with a plurality of lenses. The projection lens 12 is not limited to a spherical lens, and may be an aspherical lens, a free curved surface lens, or the like.

The light guiding device 20 includes a light transmitting member of a flat shape. The light guiding device 20 guides the image light GL generated by the image forming device 10 and then exits the light toward the eye EY of an observer, while transmitting external light EL forming the external image. The light guiding device 20 includes an incidence portion 21 on which image light is incident, a parallel light-guide body 22 that mainly guides the image light, and an exit portion 23 that exits the image light GL and the external light EL. The parallel light-guide body 22 and the incidence portion 21 are integrally formed of a plastic with high light transmittance. In the present embodiment, the light path of the image light GL propagating through the light guiding device 20 is configured with a light path of one type that reflects light in the same number of times, and may not be a combination of a plurality of types of light paths.

The parallel light-guide body 22 is disposed to be inclined with respect to the optical axis AX which uses the eye EY of the observer as a reference. A normal direction Z of a flat surface 22a of the parallel light-guide body 22 is inclined by an angle κ with respect to the optical axis AX. Thereby, the parallel light-guide body 22 can be disposed along a front face of the face, and a normal of the flat surface 22a of the parallel light-guide body 22 is inclined with respect to the optical axis AX. As such, By inclining the normal of the flat surface 22a of the parallel light-guide body 22 is inclined by the angle κ with respect to the z direction parallel to the optical axis AX, the image light GL0 on and around the optical axis AX which is exited from the optical element 30 forms an angle κ with respect to the normal of the light exit surface OS.

The direction parallel to the optical axis AX is referred to as the z direction, and among the flat surfaces perpendicular to the z direction, the horizontal direction is referred to as the x direction and the vertical direction is referred to as the y direction.

The incidence portion 21 includes a light incident surface IS and a reflection surface RS. The image light GL from the image forming device 10 is taken into the incidence portion 21 via the light incident surface IS. The image light GL taken into the incidence portion 21 is reflected by the reflection surface RS and is guided to the inside of the parallel light-guide body 22. The light incident surface IS is configured by a curved surface 21b that is a concave as viewed from the projection lens 12. The curved surface 21b also has a function of totally reflecting the image light GL reflected by the reflection surface RS on the inner surface side.

The reflection surface RS is configured with a curved surface 21a that is a concave as viewed from the projection lens 12. The reflection surface RS is formed of a metal film such as an aluminum film formed on the curved surface 21a by an evaporation method or the like. The reflection surface RS reflects the image light GL incident from the light incident surface IS and bends the light path. The curved surface 21b totally reflects the image light GL reflected by the reflection surface RS on the inner side and bends the light path. As such, the incidence portion 21 reflects the image light GL incident from the light incident surface IS twice and bends the light path, thereby reliably guiding the image light GL to the inside of the parallel light-guide body 22.

The parallel light-guide body 22 is a light guiding member of a flat shape parallel to the y axis and inclined with respect to the z axis. The parallel light-guide body (light guiding body) 22 is formed of a plastic and the like with light transmittance, and includes a pair of flat surfaces 22a and 22b substantially parallel to each other. Since the flat surfaces 22a and 22b are parallel flat surfaces, enlargement and focus shift of an external image are not made. The flat surface 22a functions as a total reflection surface that totally reflects the image light from the incidence portion 21, and guides the image light GL to the exit portion 23 with a small loss. The flat surface 22a is disposed on an external side of the parallel light-guide body 22 and functions as a first total reflection surface, and is also referred to as an external side surface in the specification.

The flat surface 22b is also referred to as an observer side surface in the specification. The flat surface 22b (observer side surface) extends to one end of the exit portion 23. Here, the flat surface 22b is a boundary IF between the parallel light-guide body 22 and the exit portion 23 (refer to FIG. 3).

In the parallel light-guide body 22, the image light GL reflected by the reflection surface RS or the light incident surface IS of the incidence portion 21 is incident on the flat surface 22a which is a total reflection surface, is totally reflected by the flat surface 22a, and is guided to a +x side or an X side on which a far side of the light guiding device 20, that is, the exit portion 23 is provided. As illustrated in FIG. 2, the parallel light-guide body 22 has a vertical end surface ES as a cross section of the +x side in an outer shape of the light guiding device 20. In addition, the parallel light-guide body 22 has an upper end surface TP and a lower end surface BP as cross sections on the ±y side.

A normal direction of the flat surface 22b is referred to as the Z direction, and among the surfaces perpendicular to the Z direction, the horizontal direction is referred to as the X direction and the vertical direction is referred to as the Y direction.

As illustrated in FIG. 3, the exit portion 23 is formed in a plate shape along the flat surface 22b or the boundary IF on the far side (+x side) of the parallel light-guide body 22. When the image light GL totally reflected by a region FR of the flat surface (total reflection surface) 22a on the external side of the parallel light-guide body 22 is allowed to pass through, the exit portion 23 reflects the incident image light GL at a predetermined angle and bends toward the light exit surface OS side. Here, the image light GL, which is first incident to the exit portion 23 without passing through the exit portion, is a target to be taken out as virtual image light. That is, although there is light reflected by an inner surface of the light exit surface OS in the exit portion 23, the light is not used as image light.

The exit portion 23 includes an optical element 30 in which a plurality of partially reflecting mirrors 31 with light transmittance are arranged in one direction. A structure of the optical element 30 will be described in detail below with reference to FIG. 4 and the like. The optical element 30 is provided along the flat surface 22b of the parallel light-guide body 22 on the observer side.

Since the light guiding device 20 has the aforementioned structure, as illustrated in FIG. 3, a light path of the image light GL exited from the image forming device 10 and incident on the light guiding device 20 from the light incident surface IS is bent by multiple reflections caused by the incidence portion 21, and the image light is totally reflected in the region FR of the flat surface 22a of the parallel light-guide body 22 and proceeds substantially along the optical axis AX. The image light GL reflected by the region FR of the flat surface 22a on the +z side is incident on the exit portion 23.

At this time, a width of the region FR in the longitudinal direction is narrower than a width of the exit portion 23 in the longitudinal direction, in an xy plane. That is, an incidence width in which a light ray of rays of the image light GL is incident on the exit portion 23 (or the optical element 30) is wider than an incidence width in which a light ray of the image light GL is incident on the region FR. As such, by relatively narrowing the incidence width in which a light ray of the image light GL is incident on the region FR, interference of the light path is less likely to occur, and the boundary IF is not used for guiding, that is, it is easy for the image light GL from the region FR to be directly incident on the exit portion 23 (or the optical element 30) without reflecting the image light GL at the boundary IF.

As the image light GL incident on the exit portion 23 is bent at an appropriate angle in the exit portion 23, the image light can be taken out, and is finally exited from the light exit surface OS. The image light GL exited from the light exit surface OS is incident on the eye EY of an observer as virtual image light. As the virtual image light forms an image on the retina of the observer, the observer can view the image light GL of the virtual image.

Here, an angle the image light GL used for image formation is incident on the exit portion 23 increases as the image light moves apart from the incidence portion 21 on the light source side. That is, the image light GL which is largely inclined with respect to the Z direction parallel to the flat surface 22a on the external side or the optical axis AX is incident on the far side of the exit portion 23 and is bent at a relatively large angle, and the image light GL which is slightly inclined with respect to the Z direction or the optical axis AX is incident on a near side of the exit portion 23 and is bent at a relatively small angle.

Light Path of Image Light

Hereinafter, the light path of the image light will be described in detail.

As illustrated in FIG. 3, components exited from a central portion of an exit surface 11a denoted by a dashed line, in the image light respectively exited from the exit surface 11a of the organic EL element 11, is defined as image light GL0, and components exited from the left side (−x and +z side) of a page, in the periphery of the exit surface 11a denoted by an alternate long and short dash line, is defined as image light GL1, and components exited from the right side (+x and −z side) of the page, in the periphery of the exit surface 11a denoted by a two-dot chain line, is defined as image light GL2. The light path of the image light GL0 among those is assumed to extend along the optical axis AX.

Main components of the image lights GL0, GL1, and GL2 that pass through the projection lens 12 are respectively incident from the light incident surface IS of the light guiding device 20, and then proceeds to the exit portion 23 by passing through the inside of the parallel light-guide body 22 via the incidence portion 21. Specifically, the image light GL0 exited from the central portion of the exit surface 11a among the image lights GL0, GL1, and GL2 is bent by the incidence portion 21 and is coupled in the parallel light-guide body 22, and then, is incident on the region FR of the one flat surface 22a at a standard reflection angle θ0 and is totally reflected, passes through the boundary IF without being reflected by the boundary IF between the parallel light-guide body 22 and the exit portion 23 (or the optical element 30), and is directly incident on the central portion 23k of the exit portion 23. The image light GL0 is reflected at a predetermined angle in the portion 23k and is exited as parallel light flux in a direction (direction of an angle κ with respect to the Z direction) of the optical axis AX inclined with respect to the XY plane including the light exit surface OS from the light exit surface OS.

The image light GL1 exited from one end side (−x side) of the exit surface 11a is bent by the incidence portion 21 and is coupled in the parallel light-guide body 22, and then, is incident on the region FR of the flat surface 22a at a maximum reflection angle θ1 and is totally reflected, passes through the boundary IF without being reflected by the boundary IF between the parallel light-guide body 22 and the exit portion 23 (or the optical element 30), is reflected at a predetermined angle in the region 23h of the far side (+x side), in the exit portion 23, and is exited as a parallel light flux from the light exit surface OS at a predetermined angle direction. At this time, in an exit angle γ1, an angle returning to the incidence portion 21 side is relatively large.

Meanwhile, the image light GL2 exited from the other end side (+x side) of the exit surface 11a is bent by the incidence portion 21 and coupled in the parallel light-guide body 22, and then, is incident on the region FR of the flat surface 22a at a minimum reflection angle θ2 and is totally reflected, passes through the boundary IF without being reflected by the boundary IF between the parallel light-guide body 22 and the exit portion 23 (or the optical element 30), is reflected at a predetermined angle in a region 23m of an near side (−x side) in the exit portion 23, and is exited as a parallel light flux from the light exit surface OS in a predetermined angular direction. At this time, in an exit angle γ2, an angle returning to the incidence portion 21 side is relatively small.

Although the image lights GL0, GL1, and GL2 are described as representative of a part of the overall rays of the image light GL, but other light components configuring the image light GL are also guided in the same manner as the image light GL0 and the like, and are exited from the light exit surface OS. Accordingly, illustration and description of these will be omitted.

Here, a value of a critical angle θc is θc≈45.6° on the assumption that n=1.4 as an example of a value of a refractive index n of a transparent plastic used for the incidence portion 21 and the parallel light-guide body 22. As the minimum reflection angle θ2 among the reflection angles θ0, θ1, and θ2 of the image lights GL0, GL1, and GL2 is set to a value larger than the critical angle θc, it is possible to satisfy total reflection conditions for necessary image light.

The image light GL0 directed to the center is incident on a portion 23k of the exit portion 23 at an elevation angle φ0 (=90°−θ0). The image light GL1 directed to the periphery is incident on a portion 23h of the exit portion 23 at an elevation angle φ1 (=90°−θ1). The image light GL2 directed to the periphery is incident on a portion 23m of the exit portion 23 at an elevation angle φ2 (=90°−θ2). Here, a relationship of φ2>φ0>φ1 is established between the elevation angles φ0, φ1, and φ2, by reflecting a magnitude relationship of the reflection angles φ0, φ1, and φ2. That is, an incidence angle t (refer to FIG. 4) on the partially reflecting mirror 31 of the optical element 30 gradually decreases in the order of the portion 23m corresponding to the elevation angle φ2, the portion 23k corresponding to the elevation angle φ0, and the portion 23h corresponding to the elevation angle φ1. In other words, the incidence angle t on the partially reflecting mirror 31 or the reflection angle by the partially reflecting mirror 31 decreases as the light moves apart from the incidence portion 21.

An overall behavior of the light ray of the image light GL reflected by the flat surface 22a on the external side of the parallel light-guide body 22 toward the exit portion 23 will be described.

As illustrated in FIG. 3, the light ray of the image light GL has a width being narrowed in any one of straight light paths P1 and P2 before and after being reflected by the region FR on the external side of the parallel light-guide body 22, in a cross section including the optical axis AX. Specifically, the light ray of the image light GL has a width being narrowed and a beam width being narrowed as a whole at a position which straddles the straight light paths P1 and P2 in the vicinity of the region FR, that is, in the vicinity of the boundary between the straight light paths P1 and P2, in a cross section including the optical axis AX. Thereby, the light ray of the image light GL is narrowed in front of the exit portion 23, and a viewing angle in the lateral direction is widened relatively and easily.

In the described example, the width and the beam width of the image light GL are narrowed at a position which straddles the straight light paths P1 and P2, but the width and the beam width may be narrowed only on one side of the straight light paths P1 and P2.

Configuration of Optical Element

Hereinafter, a configuration of the optical element 30 configuring the exit portion 23 will be described.

Figure 4:
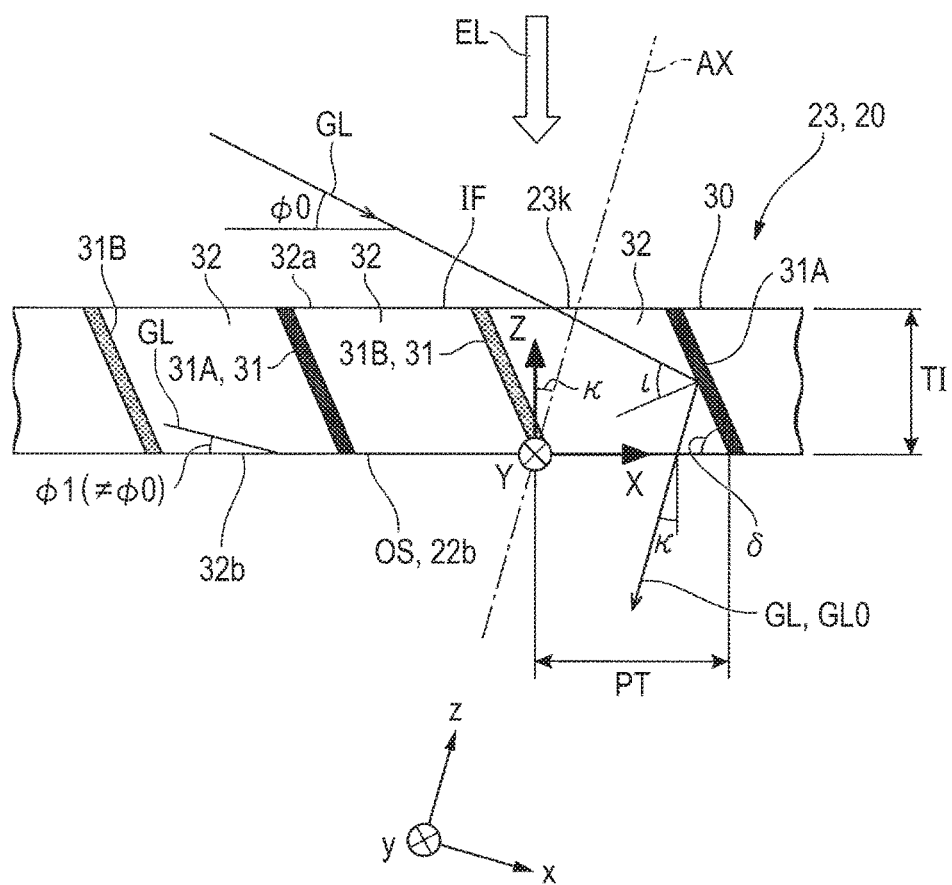
FIG. 4 is an enlarged view of an optical element according to the embodiment.

FIG. 4 is an enlarged view of the optical element 30 according to the present embodiment.

The exit portion 23 is configured by the optical element 30 provided on a viewing side surface of the parallel light-guide body 22. Therefore, the exit portion 23 is provided along the XY plane inclined by an angle κ with respect to the optical axis AX in the same manner as the parallel light-guide body 22.

As illustrated in FIG. 4, the optical element 30 includes a plurality of partially reflecting mirrors 31 and a plurality of light-transmissive members 32. The plurality of partially reflecting mirrors 31 are provided in parallel to each other with an interval therebetween, reflect a part of the image light GL and the external light EL, and transmit another part of the image light GL and the external light EL. The light-transmissive member 32 is interposed between adjacent two partially reflecting mirrors 31 of the plurality of partially reflecting mirrors 31. That is, the optical element 30 has a configuration in which the partially reflecting mirror 31 is interposed between adjacent two light-transmissive members 32 among the plurality of light-transmissive members 32. In other words, the optical element 30 has a configuration in which the partially reflecting mirrors 31 and the light-transmissive members 32 are alternately arranged.

The light-transmissive member 32 is a columnar member having a parallelogram-shaped sectional shape perpendicular to the longitudinal direction. Therefore, the light-transmissive member 32 has two sets of a pair of flat surfaces extending in parallel in the longitudinal direction and parallel to each other. Among one pair of flat surfaces of the two sets, one flat surface of the one set is an incidence surface 32a on which the image light GL and the external light EL are incident, the other flat surface of the one set is an exit surface 32b from which the image light GL and the external light EL exit. In addition, the partially reflecting mirror 31 is provided on one flat surface of the other set. The light-transmissive member 32 is formed of, for example, glass, transparent resin, or the like.

The plurality of light-transmissive members 32 are all configured to have the same shape and the same dimension. Accordingly, if a plurality of sets, each set is configured by a pair of the light-transmissive member 32 and the partially reflecting mirror 31, are bonded to each other, the plurality of partially reflecting mirrors 31 are arranged in parallel to each other. While not illustrated in FIG. 4, an adhesive layer is provided between one surface of the partially reflecting mirror 31 and the adjacent light-transmissive member 32. Thereby, the optical element 30 becomes a rectangular plate-shaped member as a whole. If the optical element 30 is viewed from a normal direction of the incidence surface 32a or the exit surface 32b of the light-transmissive member 32, a plurality of thin band-shaped partially reflecting mirrors 31 are arranged in a stripe shape. That is, the optical element 30 has a configuration in which a plurality of rectangular partially reflecting mirrors 31 are arranged at a predetermined interval PT in an extending direction of the parallel light-guide body 22, that is, in the X direction.

The partially reflecting mirror 31 is formed of a reflection film interposed between the light-transmissive members 32. The reflection film is formed of, for example, a dielectric multilayer film obtained by alternately laminating a plurality of dielectric thin films with refractive indices different from each other. In the partially reflecting mirror 31, a short side thereof is provided so as to be inclined with respect to the incidence surface 32a and the exit surface 32b of the light-transmissive member 32. More specifically, the partially reflecting mirror 31 is inclined such that a reflection surface faces the incidence portion 21 side toward an external side of the parallel light-guide body 22. In other words, the partially reflecting mirror 31 is inclined in a direction in which an upper end (+Z side) rotates counterclockwise with respect to a YZ plane orthogonal to the flat surfaces 22a and 22b by using a long side (Y direction) of the partially reflecting mirror 31 as ab axis. That is, each of the plurality of partially reflecting mirrors 31 is disposed so as to be inclined with respect to the incidence surface 32a and the exit surface 32b.

Hereinafter, an angle formed by the reflection surface of the partially reflecting mirror 31 and the exit surface 32b of the light-transmissive member 32 is defined as an inclination angle δ of the partially reflecting mirror 31. In the present embodiment, the inclination angle δ of the partially reflecting mirror 31 is greater than or equal to 45° and smaller than 90°. In the present embodiment, the refractive index of the light-transmissive member 32 is equal to the refractive index of the parallel light-guide body 22, but the refractive indices thereof may be different from each other. In a case where the refractive index is different, it is necessary to change the inclination angle δ of the partially reflecting mirror 31 with respect to a case where the refractive indices are equal.

The plurality of partially reflecting mirrors 31 include predetermined polarized light components included in the image light GL and the external light EL, specifically, at least one first partially reflecting mirror 31A and at least one second partially reflecting mirror 31B which have different reflectances with respect to S-polarized light components and P-polarized light components. In the present embodiment, the plurality of partially reflecting mirrors 31 include a plurality of first partially reflecting mirrors 31A and a plurality of second partially reflecting mirrors 31B. The first partially reflecting mirror 31A and the second partially reflecting mirror 31B are alternately arranged in an arrangement direction (X direction) of the plurality of partially reflecting mirrors 31.

Figure 5:
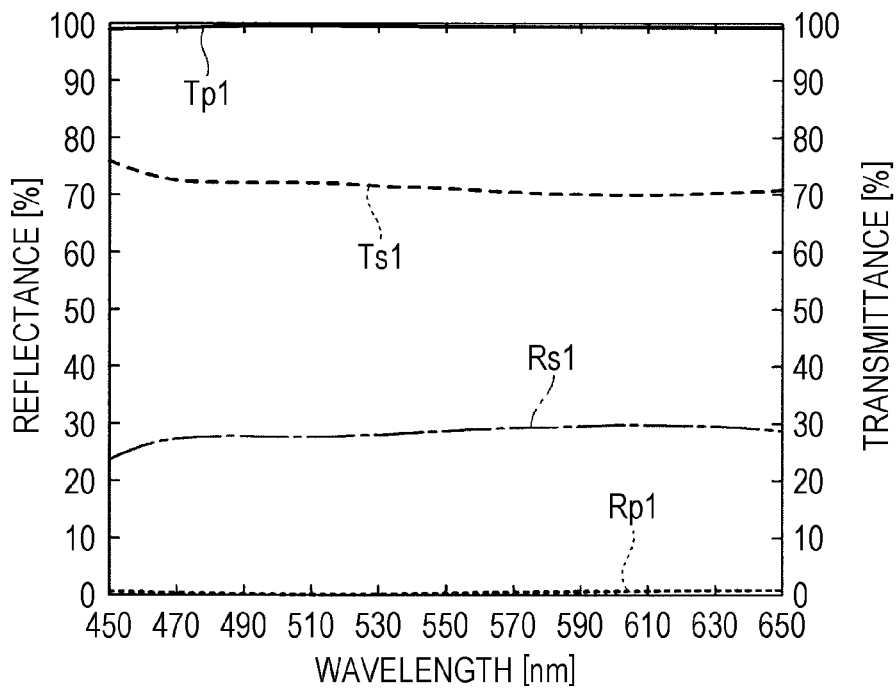
FIG. 5 is a graph illustrating reflection and transmission characteristics of a first partially reflecting mirror.

FIG. 5 is a graph illustrating reflection and transmission characteristics of the first partially reflecting mirror 31A. In FIG. 5, a horizontal axis represents a wavelength [nm], and a vertical axis represents a reflectance [%] and transmittance [%].

As illustrated in FIG. 5, in the first partially reflecting mirror 31A, a reflectance Rs1 of the S-polarized light components is in a range of approximately 25 to 30%, transmittance Ts1 of the S-polarized light components is in a range of approximately 70 to 75%, a reflectance Rp1 of the P-polarized light components is approximately 0%, and transmittance Tp1 of the P-polarized light components is approximately 100%, over the wavelength range of 450 nm to 650 nm. The first partially reflecting mirror 31A having such characteristics is configured with a dielectric multilayer film of, for example, $Al_2O_3$ having a film thickness of 176 nm, $TiO_2$ having a film thickness of 24 nm, $Al_2O_3$ having a film thickness of 56 nm, and $TiO_2$ having a film thickness of 108 nm.

Figure 6:
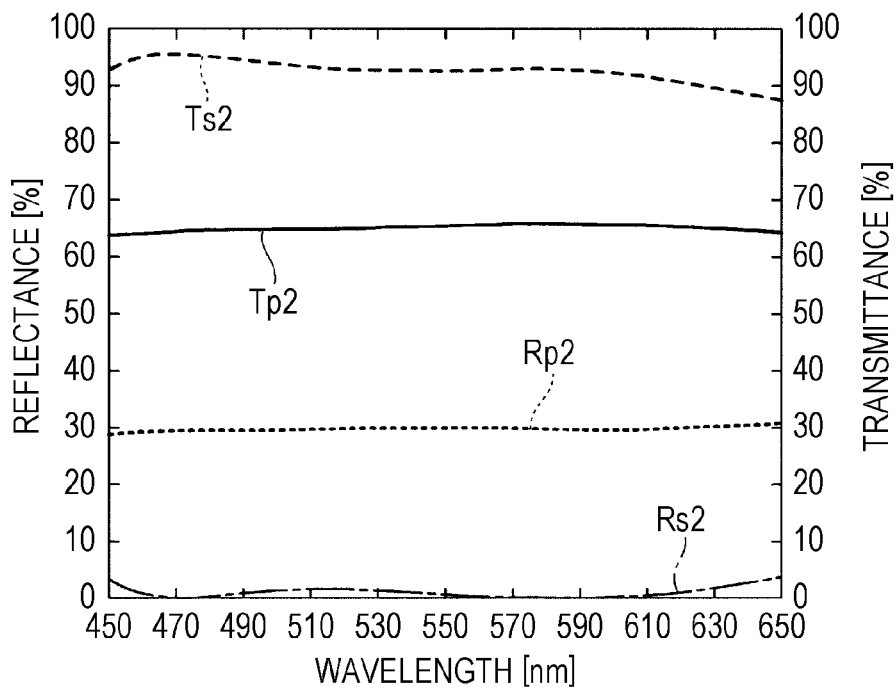
FIG. 6 is a graph illustrating reflection and transmission characteristics of a second partially reflecting mirror.

FIG. 6 is a graph illustrating the reflection and transmission characteristics of the second partially reflecting mirror 31B. In FIG. 6, a horizontal axis represents a wavelength [nm], and a vertical axis represents a reflectance [%] and transmittance [%].

As illustrated in FIG. 6, in the second partially reflecting mirror 31B, a reflectance Rs2 of the S-polarized light components is in a range of approximately 0 to 5%, transmittance Ts2 of the S-polarized light components is in a range of approximately 90 to 95%, a reflectance Rp2 of the P-polarized light components is approximately 30%, and transmittance Tp2 of the P-polarized light components is approximately 65%, over the wavelength range of 450 nm to 650 nm. The second partially reflecting mirror 31B having such characteristics is configured with, a dielectric multilayer film and a metal film of, for example, $Al_2O_3$ having a film thickness of 190 nm, $TiO_2$ having a film thickness of 48 nm, Ag having a film thickness of 15 nm, $TiO_2$ having a film thickness of 42 nm, and $Al_2O_3$ having a film thickness of 25 nm.

Here, in the first partially reflecting mirror 31A, for the sake of simple description, the reflectance Rs1 of the S-polarized light components is set to Rs1=0.3 (30%), the transmittance Ts1 of the S-polarized light components is set to Ts1=0.7 (70%), the reflectance Rp1 of the P-polarized light components is set to Rp1=0 (0%), and the transmittance Tp1 of the P-polarized light components is set to 1 (100%). In the second partially reflecting mirror 31B, the reflectance Rs2 of the S-polarized light components is Rs2=0 (0%), the transmittance Ts2 of the S-polarized light components is Ts2=1 (100%), the reflectance Rp2 of the P-polarized light components is Rp2=0.3 (30%), and the transmittance Tp2 of the P-polarized light components is Tp2=0.7 (70%).

An average value of the reflectance Rs1 of the S-polarized light components and the reflectance Rp1 of the P-polarized light components for the first partially reflecting mirror 31A is referred to as an average reflectance R1 of the first partially reflecting mirror 31A. In addition, an average value of the reflectance Rs2 of the S-polarized light components and the reflectance Rp2 of the P-polarized light components for the second partially reflecting mirror 31B is referred to as an average reflectance R2 of the second partially reflecting mirror 31B. In the present embodiment, the average reflectance R1 of the first partially reflecting mirror 31A and the average reflectance R2 of the second partially reflecting mirror 31B are both 15%. Therefore, the first partially reflecting mirror 31A has the reflectance Rs1 of the S-polarized light components higher than the average reflectance R1 (Rs1>R1) and the reflectance Rp1 of the P-polarized light components lower than the average reflectance R1 (Rp1<R1). The second partially reflecting mirror 31B has the reflectance Rs2 of the S-polarized light components lower than the average reflectance R2 (Rs2<R2) and the reflectance Rp2 of the P-polarized light components higher than the average reflectance R2 (Rp2>R2).

The pitch PT between the adjacent partially reflecting mirrors 31 is set to approximately 0.5 mm to 2.0 mm. Strictly speaking, the pitch PT between the partially reflecting mirrors 31 is not equally spaced but is disposed at a variable pitch. More specifically, the interval PT of the partially reflecting mirror 31 in the optical element 30 is a random pitch that randomly increases or decreases around the reference interval. As such, by arranging the partially reflecting mirrors 31 in the optical element 30 at random pitches, occurrence of diffraction unevenness and moire can be suppressed. A predetermined pitch pattern including not only the random pitch but also the pitch that increases and decreases in a plurality of stages may be repeated.

A thickness of the optical element 30, that is, a thickness TI of the partially reflecting mirror 31 in the Z-axis direction is set to approximately 0.7 mm to 3.0 mm. A thickness of the parallel light-guide body 22 supporting the optical element 30 is, for example, approximately several mm to 10 mm, preferably, approximately 4 mm to 6 mm. If the thickness of the parallel light-guide body 22 is much larger than the thickness of the optical element 30, the incidence angle of the image light GL on the optical element 30 or the boundary IF may be easily reduced, and reflection by the partially reflecting mirror 31 at a position where the image light GL is not taken into the eye EY is easily suppressed. Meanwhile, if the thickness of the parallel light-guide body 22 is relatively thin, weights of the parallel light-guide body 22 and the light guiding device 20 are easily reduced.

First Operation and Effects of Optical Element

Hereinafter, a first operation and effects of an optical element 30 according to the present embodiment will be described.

Figure 7:
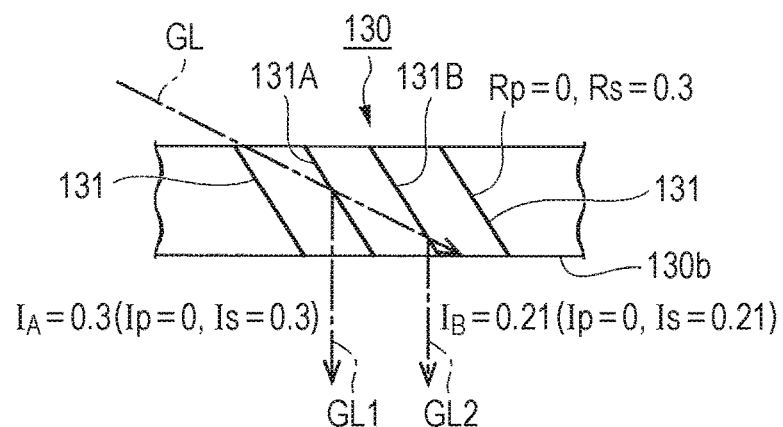
FIG. 7 is a view illustrating an operation of an optical element in the related art.

FIG. 7 is a view illustrating the first operation of the optical element 130 in the related art.

As illustrated in FIG. 7, in the optical element 130, reflection characteristics of a plurality of partially reflecting mirrors 131 are the same over all the partially reflecting mirrors 131. The reflectance Rp of the P-polarized light components with respect to the partially reflecting mirror 131 is set to Rp=0 (0%), and the reflectance Rs of the S-polarized light components is set to Rs=0.3 (30%). In addition, the transmittance Tp of the P-polarized light components with respect to the partially reflecting mirror 131 is set to Tp=100 (100%) and the transmittance Ts of the S-polarized light components is set to Ts=0.7 (70%).

Here, a case where the image light GL is incident on the optical element 130 so as to pass through the two partially reflecting mirrors 131 is considered. The partially reflecting mirror 131 on which the image light GL is first incident is referred to as a first partially reflecting mirror 131A, and the partially reflecting mirror 131 on which the image light GL passing through the first partially reflecting mirror 131A is next incident is referred to as a second partially reflecting mirror 131B. Intensity of the image light GL1 reflected by the first partially reflecting mirror 131A and guided to the eye of an observer is referred to as $I_A$, and intensity of the image light GL2 reflected by the second partially reflecting mirror 131B and guided to the eye of the observer is referred to as $I_B$. Hereinafter, the image light GL reflected by the respective partially reflecting mirrors 131 and guided to the eyes of the observer is referred to as reflected light from the respective partially reflecting mirrors 131.

When the intensity of the original image light GL is set to 1, the intensity $I_A$ of the reflected light GL1 from the first partially reflecting mirror 131A is the sum of the intensity Ip1 of the P-polarized light components and the intensity Is1 of the S-polarized light components which are reflected by the first partially reflecting mirror 131A, and is represented by $I_A$=Ip1+Is1=Rp+Rs=0+0.3=0.3.

The intensity $I_B$ of the reflected light GL2 from the second partially reflecting mirror 131B is the sum of the intensity Ip2 of the P-polarized light components and the intensity Is2 of the S-polarized light components which are reflected by the second partially reflecting mirror 131B after passing through the first partially reflecting mirror 131A, and is represented by $I_B$=Ip2+Is2=Tp×Rp+Ts×Rs=1×0+0.7×0.3=0.21. From the above, an intensity difference d of the reflected light from the adjacent two partially reflecting mirrors is d=[$I_A$-$I_B$]=0.09.

As such, in the optical element 130 in the related art, the reflected light GL1 from the first partially reflecting mirror 131A and the reflected light GL2 from the second partially reflecting mirror 131B have different intensities. Accordingly, in the optical element 130 in the related art, peaks and valleys are generated in an intensity profile of the reflected light on the exit surface 130b, and striped unevenness is viewed.

In contrast to this, in the optical element 30 according to the present embodiment, the first partially reflecting mirrors 31A and the second partially reflecting mirrors 31B are alternately arranged as described above. In addition, in the first partially reflecting mirror 31A, the reflectance Rs1 of the S-polarized light components is 0.3, the transmittance Ts1 of the S-polarized light components is 0.7, the reflectance Rp1 of the P-polarized light components is 0, and the transmittance Ip1 of the P-polarized light components is 1. In the second partially reflecting mirror 31B, the reflectance Rs2 of the S-polarized light components is 0, the transmittance Ts2 of the S-polarized light components is 1, the reflectance Rp2 of the P-polarized light components is 0.3, and the transmittance Tp2 of the P-polarized light components is 0.7.

Figure 8:
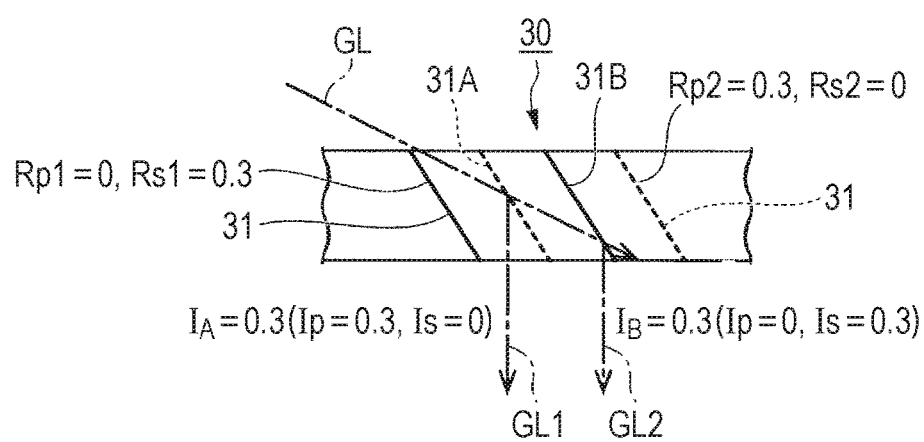
FIG. 8 is a view illustrating an operation of the optical element according to the embodiment.

FIG. 8 is a view illustrating an operation of the optical element 30 according to the present embodiment.

As illustrated in FIG. 8, also in the optical element 30 according to the present embodiment, a case where the image light GL is incident on the optical element 30 so as to pass through the two partially reflecting mirrors 31 of the first partially reflecting mirror 31A and the second partially reflecting mirror 31B is considered.

When intensity of the original image light GL is 1, the intensity $I_A$ of the reflected light GL1 from the first partially reflecting mirror 31A is the sum of the intensity Ip1 of the P-polarized light components and the intensity Is1 of the S-polarized light components which are reflected by the first partially reflecting mirror 31A, and is represented by $I_A$=Ip1+Is1=Rp1+Rs1=0+0.3=0.3.

The intensity $I_B$ of the reflected light GL1 from the second partially reflecting mirror 31B is the sum of the intensity Ip2 of the P-polarized light components and the intensity Is2 of the S-polarized light components which are reflected by the second partially reflecting mirror 31B after passing through the first partially reflecting mirror 31A, and is represented by $I_B=Ip2+Is2=Tp1\times Rp2+Ts1\times Rs2=1\times 0.3+0.7\times 0=0.3$.

As such, in the optical element 30 according to the present embodiment, the intensity of the reflected light GL1 from the first partially reflecting mirror 31A and the intensity of the reflected light GL2 from the second partially reflecting mirror 31B may be equal.

Figure 9:
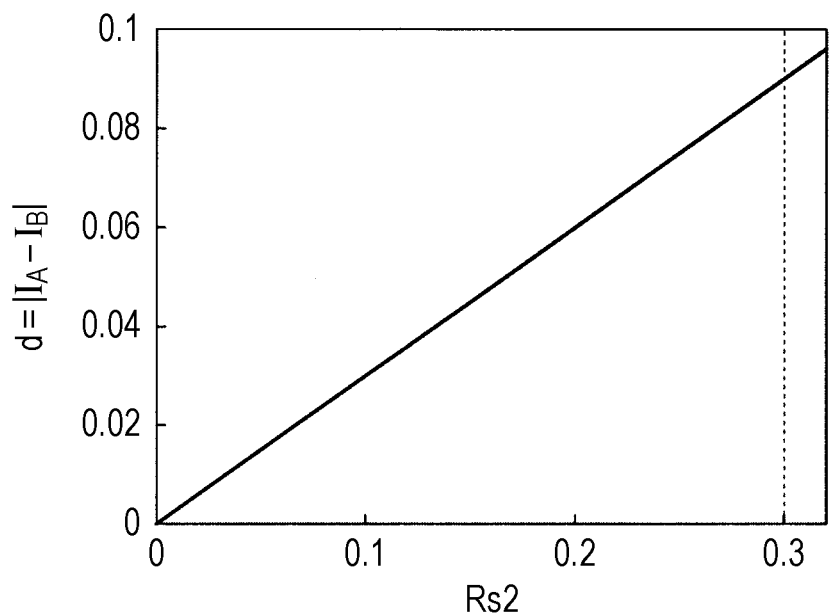
FIG. 9 is a graph illustrating an example of a relationship between a reflectance of S-polarized light components of the second partially reflecting mirror and a light intensity difference.

FIG. 9 is a graph illustrating an example of a relationship between the reflectance Rs2 (horizontal axis) of the S-polarized light components of the second partially reflecting mirror 31B and the light intensity difference d (vertical axis), when the reflectance Rs1 of the S-polarized light components of the first partially reflecting mirror 31A is set to 0.3 and the reflectance Rp1 of the P-polarized light components is set to 0. In the graph of FIG. 9, a point of Rs 2=0.3 represents a plot of the optical element 130 in the related art in which the reflectance of the S-polarized light components in the first partially reflecting mirror and the second partially reflecting mirror is equal, and the light intensity difference d at this time is 0.09. The graph of FIG. 9 illustrates that, as the reflectance Rs2 of the S-polarized light components of the second partially reflecting mirror 31B decreases from 0.3, the light intensity difference d linearly decreases.

That is, in a case where the reflectance Rs1 of the S-polarized light components is larger than the average reflectance R1, Rs2 is set to be smaller than Rs1, and thereby, it is possible to reduce the intensity difference between the reflected light GL1 from the first partially reflecting mirror 31A and the reflected light GL2 from the second partially reflecting mirror 31B. It is preferable that the difference between the reflectance Rs1 of the S-polarized light components of the first partially reflecting mirror 31A and the reflectance Rs2 of the S-polarized light components of the second partially reflecting mirror 31B be large.

Figure 10:
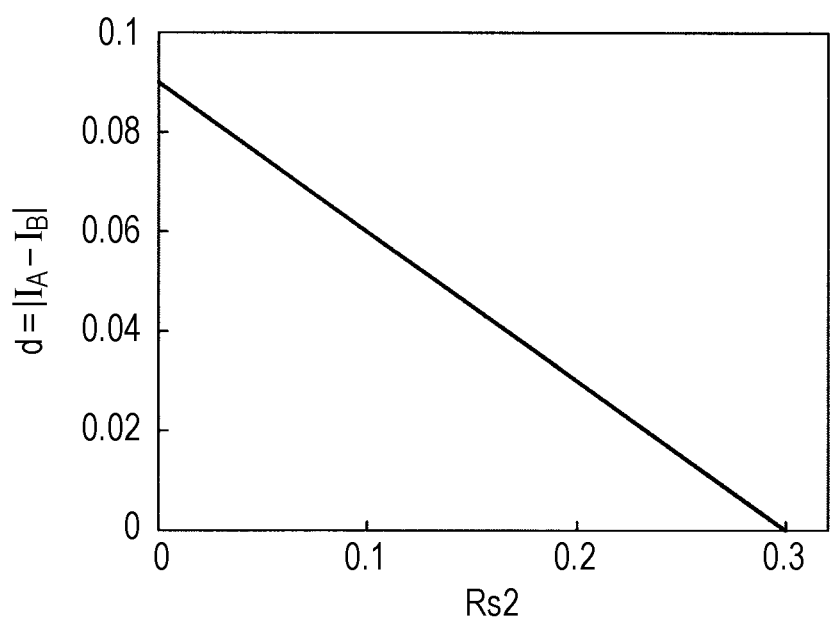
FIG. 10 is a graph illustrating another example of the relationship between the reflectance of the S-polarized light components of the second partially reflecting mirror and the light intensity difference.

FIG. 10 is a graph illustrating an example of a relationship between the reflectance Rs2 (horizontal axis) of the S-polarized light components of the second partially reflecting mirror 31B and the light intensity difference d (vertical axis), when the reflectance Rs1 of the S-polarized light components of the first partially reflecting mirror 31A is set to 0 and the reflectance Rp1 of the P-polarized light components is set to 0.3. That is, in FIG. 10, the value of the reflectance Rs1 of the S-polarized light components and the value of the reflectance Rp1 of the P-polarized light components of the first partially reflecting mirror 31A in FIG. 9 are exchanged.

The graph of FIG. 10 has an inclination opposite to the inclination of the graph of FIG. 9, and indicates that, as Rs2 becomes larger from 0, the light intensity difference d linearly decreases. In the graph of FIG. 10, a point of Rs2=0 represents a case where the optical element in the related art has the same reflectance of the S-polarized light components in the first partially reflecting mirror and the second partially reflecting mirror, and the light intensity difference d at this time is 0.09. In contrast to this, in a case where the reflectance Rs1 of the S-polarized light components is smaller than the average reflectance R1, Rs2 is set to be larger than Rs1, and thereby, it is possible to reduce the intensity difference between the reflected light GL1 from the first partially reflecting mirror 31A and the reflected light GL2 from the second partially reflecting mirror 31B.

That is, when considering FIGS. 9 and 10 together, magnitudes of the reflectance of the S-polarized light components in the plurality of partially reflecting mirrors 31 are set so as to be alternately arranged like large, small, large, small, . . . with respect to the average reflectance, and thereby, it is possible to reduce the intensity difference between the reflected light from the adjacent two partially reflecting mirrors 31.

Figure 11:
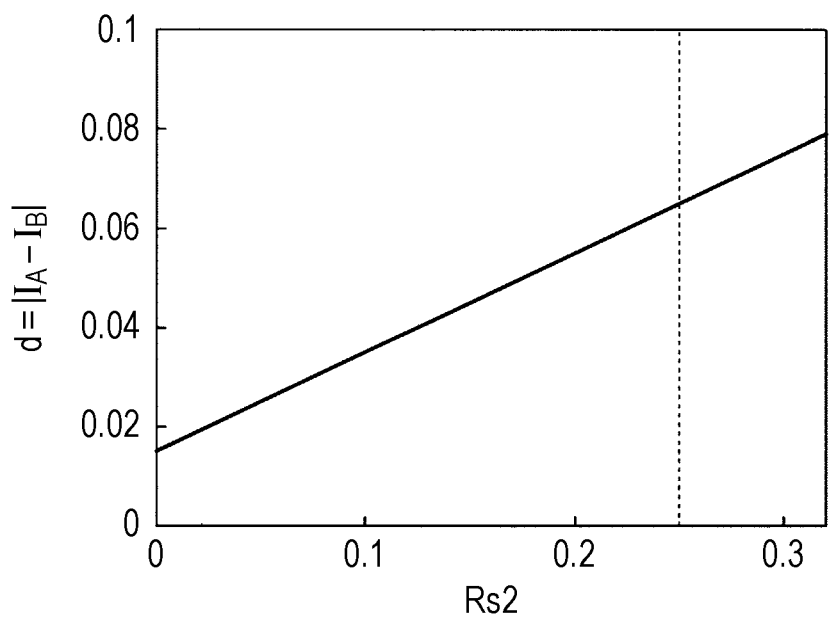
FIG. 11 is a graph illustrating still another example of the relationship between the reflectance of the S-polarized light components of the second partially reflecting mirror and the light intensity difference.

FIG. 11 is a graph illustrating an example of a relationship between the reflectance Rs2 (horizontal axis) of the S-polarized light components of the second partially reflecting mirror 31B and the light intensity difference d (vertical axis), when the reflectance Rs1 of the S-polarized light components of the first partially reflecting mirror 31A is set to 0.25 and the reflectance Rp1 of the P-polarized light components is set to 0.05. That is, in FIG. 11, the value of the reflectance Rs1 of the S-polarized light components and the reflectance Rp1 of the P-polarized light components of the first partially reflecting mirror 31A in FIG. 9 are respectively changed.

The graph of FIG. 11 also indicates that, as the reflectance Rs2 of the S-polarized light components of the second partially reflecting mirror 31B decreases from 0.25, the light intensity difference d linearly decreases in the same manner as the graph of FIG. 9. That is, even in a case where the reflectance Rp1 of the P-polarized light components of the first partially reflecting mirror 31A takes a value other than 0, and in a case where the reflectance Rs1 of the S-polarized light components is larger than the average reflectance R1, Rs2 is set to be smaller than Rs1, and thereby, it is possible to reduce the intensity difference between the reflected light GL1 from the first partially reflecting mirror 31A and the reflected light GL2 from the second partially reflecting mirror 31B.

As described above, a case where the image light GL is incident on the optical element 30 so as to pass through the two partially reflecting mirrors 31 is considered, but next, a case where the image light GL is incident on the optical element 30 so as to pass through more partially reflecting mirrors 31 is considered.

Figure 12:
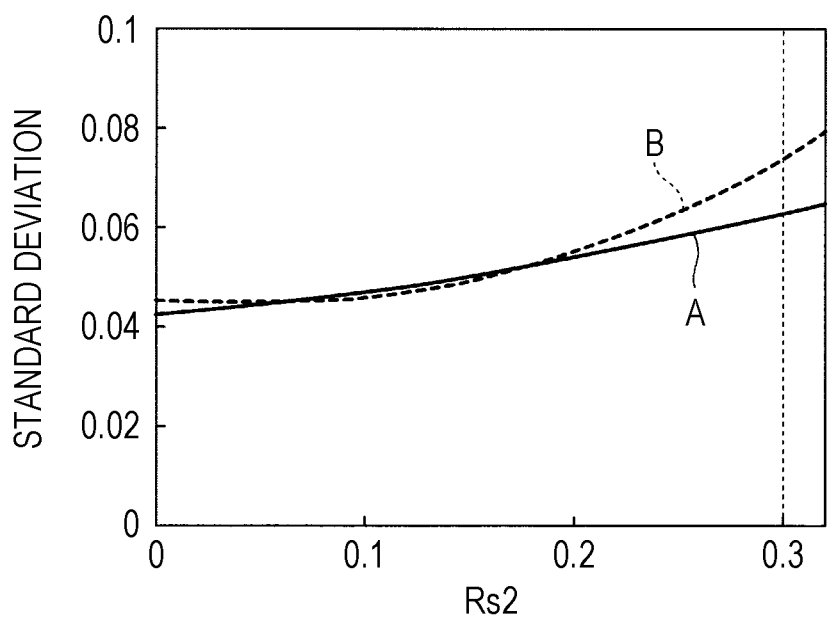
FIG. 12 is graphs illustrating a relationship between the reflectance of the S-polarized light components of the second partially reflecting mirror and standard deviation of the light intensity difference.

FIG. 12 is graphs illustrating an example of a relationship between the reflectance Rs2 (horizontal axis) of the S-polarized light components of the second partially reflecting mirror 31B and the standard deviation of the light intensity difference d (vertical axis), when the reflectance Rs1 of the S-polarized light components of the first partially reflecting mirror 31A is set to 0.3 and the reflectance Rp1 of the P-polarized light components is set to 0. The graph of a symbol A indicates a standard deviation of intensity of the reflected light from the adjacent three partially reflecting mirrors 31. The graph of a symbol B indicates a standard deviation of intensity of the reflected light from the adjacent four partially reflecting mirrors 31.

When comparing the graph of the symbol A and the graph of the symbol B with the graph of FIG. 9, a shape of the graph is somewhat different, but a correlation between the reflectance Rs2 of the S-polarized light components and a magnitude of the light intensity difference is similar. That is, even if the number of partially reflecting mirrors 31 that the light passes through increases, the partially reflecting mirrors can be considered in the same manner as in a case where the number of partially reflecting mirrors 31 that the light passes through is two. In a case where the reflectance Rs1 of the S-polarized light components of the first partially reflecting mirror 31A is larger than the average reflectance R1, the reflectance Rs2 of the S-polarized light components of the second partially reflecting mirror 31B is set to be smaller than Rs1, and thereby, it is possible to reduce the intensity difference between the reflected lights from the plurality of partially reflecting mirrors.

The present inventor observed striped unevenness generated when the optical element 130 in the related art was used.

Figure 13:
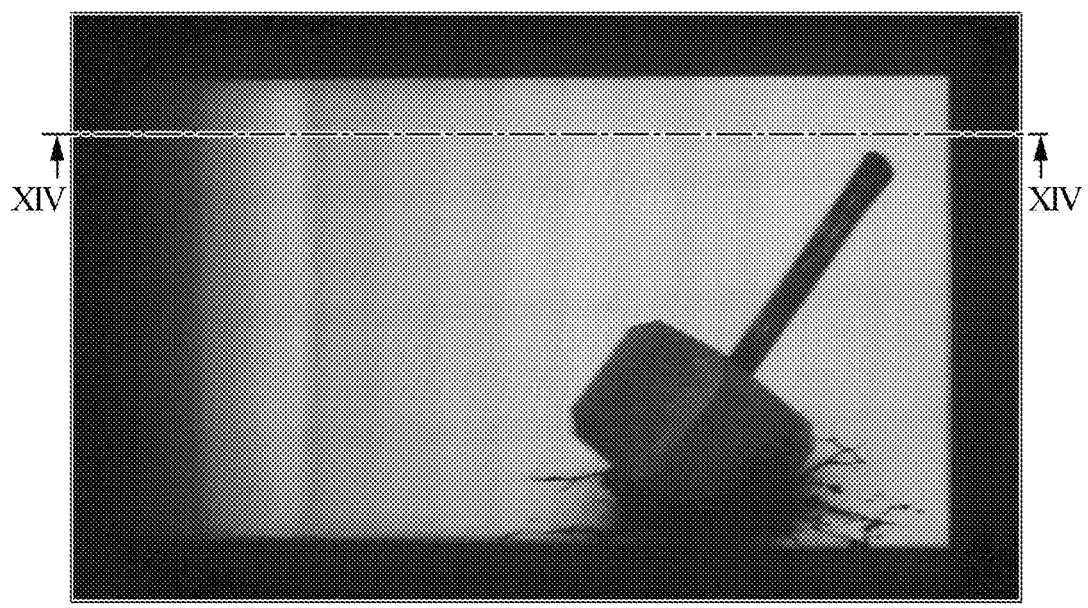
FIG. 13 is a photograph illustrating an example of a display image of the optical element in the related art.
Figure 14:
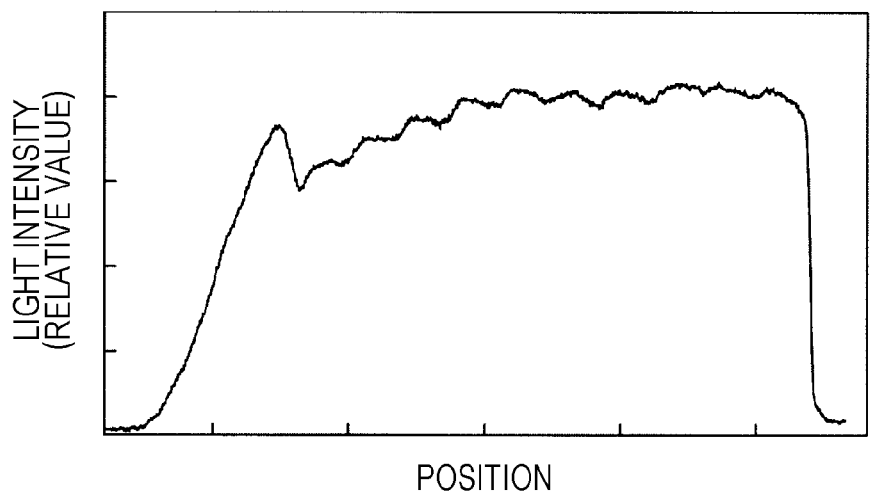
FIG. 14 is a diagram illustrating a light intensity profile along line XIV-XIV of FIG. 13.

FIG. 13 is a photograph illustrating an example of a display image generated by the optical element 130 in the related art which is an observation result. FIG. 14 is a diagram illustrating a light intensity profile at respective positions along line XIV-XIV of FIG. 13.

As illustrated in FIG. 13 and FIG. 14, in a case the optical element 130 in the related art is used, small striped bright and dark unevenness appears in the entire image, and a large dark line appears at the left end of the image. In a case where stripe-shaped bright and dark unevenness of the entire image decreases, the first partially reflecting mirrors 31A and the second partially reflecting mirrors 31B may be configured to be alternately arranged with respect to all the partially reflecting mirrors in the optical element as a remedy for this. Alternatively, in a case where only the dark line at the left end of the image is reduced, the first partially reflecting mirrors 31A and the second partially reflecting mirrors 31B may be configured to be alternately arranged with respect to only a part of the partially reflecting mirrors in the optical element corresponding to the left end of the image.

Second Operation and Effects of Optical Element

Hereinafter, a second operation and effects of the optical element 30 according to the present embodiment will be described.

Figure 15:
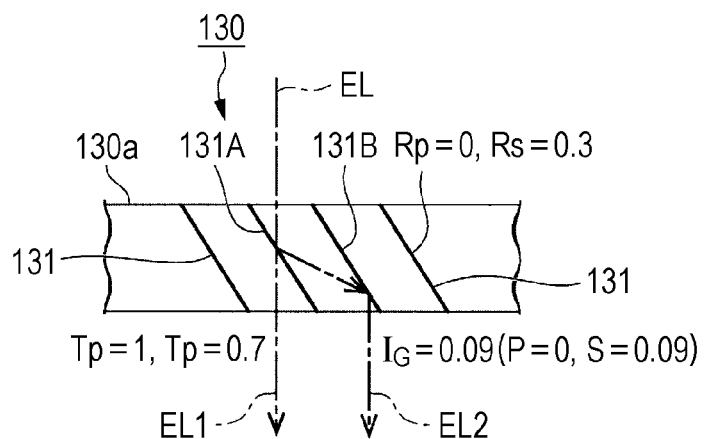
FIG. 15 is a view illustrating another operation of the optical element in the related art.

FIG. 15 is a view illustrating the second operation of the optical element 130 in the related art.

As illustrated in FIG. 15, in the optical element 130 in the related art, the reflection characteristics of the plurality of partially reflecting mirrors 131 are the same over all the partially reflecting mirrors 131. The reflectance Rp of the P-polarized light components with respect to the partially reflecting mirror 131 is set to Rp=0 (0%), and the reflectance Rs of the S-polarized light components is set to Rs=0.3 (30%). In addition, the transmittance Tp of the P-polarized light components with respect to the partially reflecting mirror 131 is set to Tp=1 (100%), and the transmittance Ts of the S-polarized light components is set to Ts=0.7 (70%).

A case where the external light EL is perpendicularly incident on the incidence surface 130a of the optical element 130 is considered. The partially reflecting mirror 131 on which the external light EL is first incident is referred to as a first partially reflecting mirror 131A and the partially reflecting mirror 131 on which the external light EL reflected by the first partially reflecting mirror 131A is next incident is referred to as a second partially reflecting mirror 131B. Intensity of the transmitted light EL 1 that passes through the first partially reflecting mirror 131A and is guided to the eye of an observer is referred to as $I_C$, and intensity of the reflected light EL2 that is reflected by the first partially reflecting mirror 131A, is reflected again by the second partially reflecting mirror 131B, and is guided to the eye of the observer is referred to as $I_G$.

When intensity of the original external light EL is set to 1, the intensity $I_C$ of the transmitted light EL1 from the first partially reflecting mirror 131A is the sum of the intensity Ip1 of the P-polarized light components passing through the first partially reflecting mirror 131A and the intensity Is1 of the S-polarized light components, and is represented by $I_C$=Ip1+Is1=Tp+Ts=1+0.7=1.7.

In contrast to this, the intensity $I_G$ of the reflected light EL2 from the second partially reflecting mirror 131B is the sum of the intensity Ip2 of the P-polarized light components reflected by the second partially reflecting mirror 131B after being reflected by the first partially reflecting mirror 131A and the intensity Is2 of the S-polarized light components, and is represented by $I_G$=Ip2+Is2=Rp×Rp+Rs×Rs=0×0+ 0.3×0.3=0.09. In this case, since the reflected light is exited from the second partially reflecting mirror 131B adjacent to the first partially reflecting mirror 131A, a phenomenon (ghost) appears in which an external image is dually viewed.

Here, if a value of $I_G/I_G$ is defined as ghost contrast C, C=0.09/1.7=0.053.

In contrast to this, in the optical element 30 according to the present embodiment, as described above, the first partially reflecting mirrors 31A and the second partially reflecting mirrors 31B are alternately arranged. In addition, in the first partially reflecting mirror 31A, the reflectance Rs1 of the S-polarized light components is 0.3, the transmittance Ts1 of the S-polarized light components is 0.7, the reflectance Rp1 of the P-polarized light components is 0, and the transmittance Tp1 of the P-polarized light components is 1. In the second partially reflecting mirror 31B, the reflectance Rs2 of the S-polarized light components is 0, the transmittance Ts2 of the S-polarized light components is 1, the reflectance Rp2 of the P-polarized light components is 0.3, and the transmission Tp2 of the P-polarized light components is 0.7.

Figure 16:
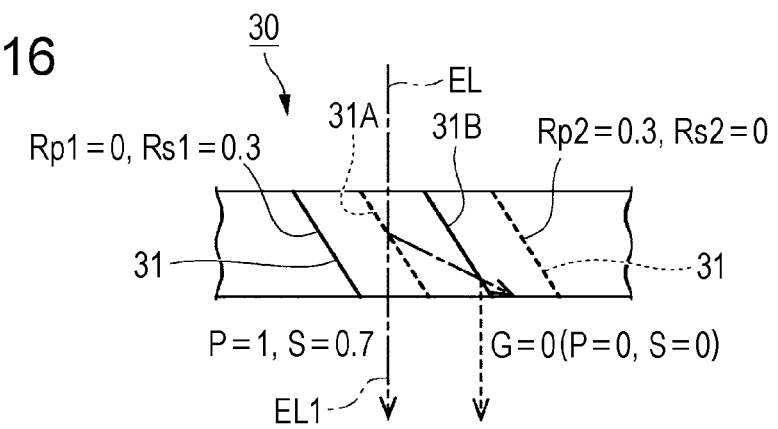
FIG. 16 is a view illustrating another operation of the optical element according to the embodiment.

FIG. 16 is a view illustrating the second operation of the optical element 30 according to the present embodiment.

As illustrated in FIG. 16, when the intensity of the original external light EL is set to 1, the intensity $I_C$ of the transmitted light EL1 from the first partially reflecting mirror 31A is the sum of the intensity Ip1 of the P-polarized light components passing through the first partially reflecting mirror 31A and the intensity Is1 of the S-polarized light components, and is represented by $I_C$=Ip1+Is1=Tp1+Ts1=1+0.7=1.7. In addition, the intensity $I_G$ of the reflected light from the second partially reflecting mirror 31B is the sum of the intensity Ip2 of the P-polarized light components reflected by the second partially reflecting mirror 31B after being reflected by the first partially reflecting mirror 31A and the intensity Is2 of the S-polarized light components, and is represented by $I_G$=Ip2+Is2=Rp1×Rp2+Rs1×Rs2=0×0.3+0.3×0=0. That is, there is no light that is reflected by the first partially reflecting mirror 31A and thereafter, is reflected by the second partially reflecting mirror 31B, and then, is guided to the eye of an observer.

As such, in the optical element 30 according to the present embodiment, it is possible to suppress that a part of the external light EL incident on one partially reflecting mirror 31 is reflected and is exited from the adjacent partially reflecting mirror 31, and thus, there is little possibility that ghost of the external image is viewed.

Figure 17:
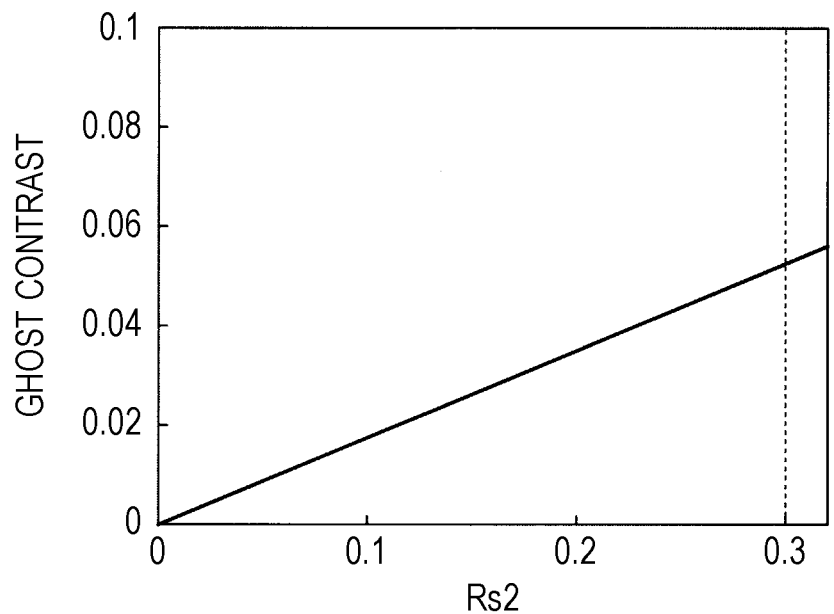
FIG. 17 is a graph illustrating an example of a relationship between the reflectance of the S-polarized light components and ghost contrast of the second partially reflecting mirror.

FIG. 17 is a graph illustrating an example of a relationship between the reflectance Rs2 of the S-polarized light components of the second partially reflecting mirror 31B (horizontal axis) and the ghost contrast (vertical axis), when the reflectance Rs1 of the S-polarized light components of the first partially reflecting mirror 31A is set to 0.3 and the reflectance Rp1 of the P-polarized light components is set to 0.

In the graph of FIG. 17, a point of Rs2=0.3 represents a case where the optical element in the related art has the same reflectance of S-polarized light components of the first partially reflecting mirror and the second partially reflecting mirror, and the ghost contrast at this time is 0.053. In addition, the graph of FIG. 17 illustrates that, as Rs2 decreases from 0.3, the ghost contrast decreases, that is, the ghost is hard to be viewed.

That is, in a case where the reflectance Rs1 of the S-polarized light components is larger than the average reflectance R1, Rs2 is set to be smaller than Rs1, and thereby, it is possible to reduce the ghost contrast. It is preferable that a difference between the reflectance Rs1 of the S-polarized light components of the first partially reflecting mirror and the reflectance Rs2 of the S-polarized light components of the second partially reflecting mirror be large.

Figure 18:
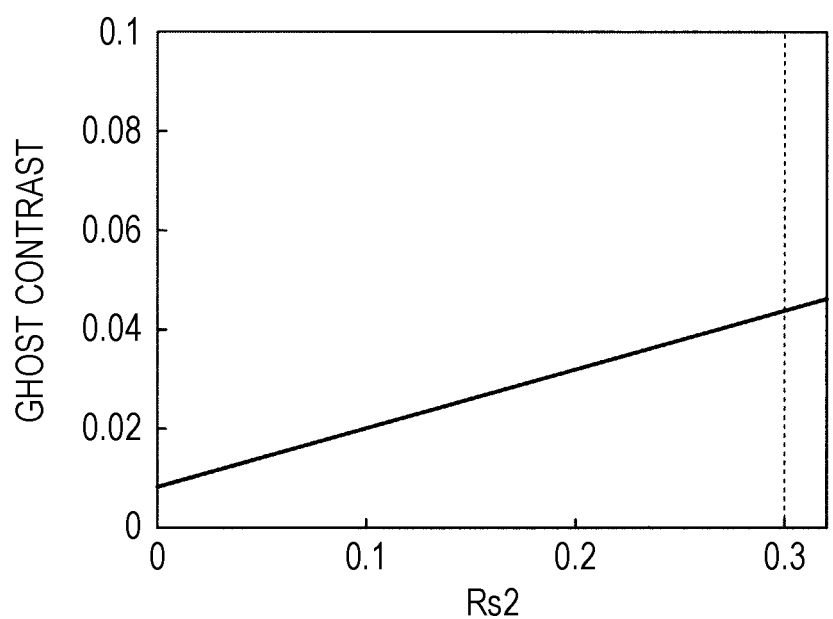
FIG. 18 is a graph illustrating another example of a relationship between the reflectance of the S-polarized light components and the ghost contrast of the second partially reflecting mirror.

FIG. 18 is a graph illustrating an example of the relationship between the reflectance Rs2 of the S-polarized light components of the second partially reflecting mirror 31B (horizontal axis) and the ghost contrast (vertical axis), when the reflectance Rs1 of the S-polarized light components of the first partially reflecting mirror 31A is set to 0.25 and the reflectance Rp1 of the P-polarized light components is set to 0.5. That is, in FIG. 18, a value of the reflectance Rs1 of the S-polarized light components and the reflectance Rp1 of the P-polarized light components of the first partially reflecting mirror 31A in FIG. 17 are respectively changed.

The graph of FIG. 18 also illustrates that, as Rs2 decreases from 0.25, the ghost contrast decreases in the same manner as the graph of FIG. 17. That is, even in a case where the reflectance Rp1 of the P-polarized light components of the first partially reflecting mirror 31A takes a value other than 0, in a case where the reflectance Rs1 of the S-polarized light components is larger than the average reflectance R1, Rs2 is set to be smaller than Rs1, and thereby, there is little possibility that the ghost is viewed.

The present inventor performed a simulation relating to an occurrence situation of the ghost.

Figure 19:
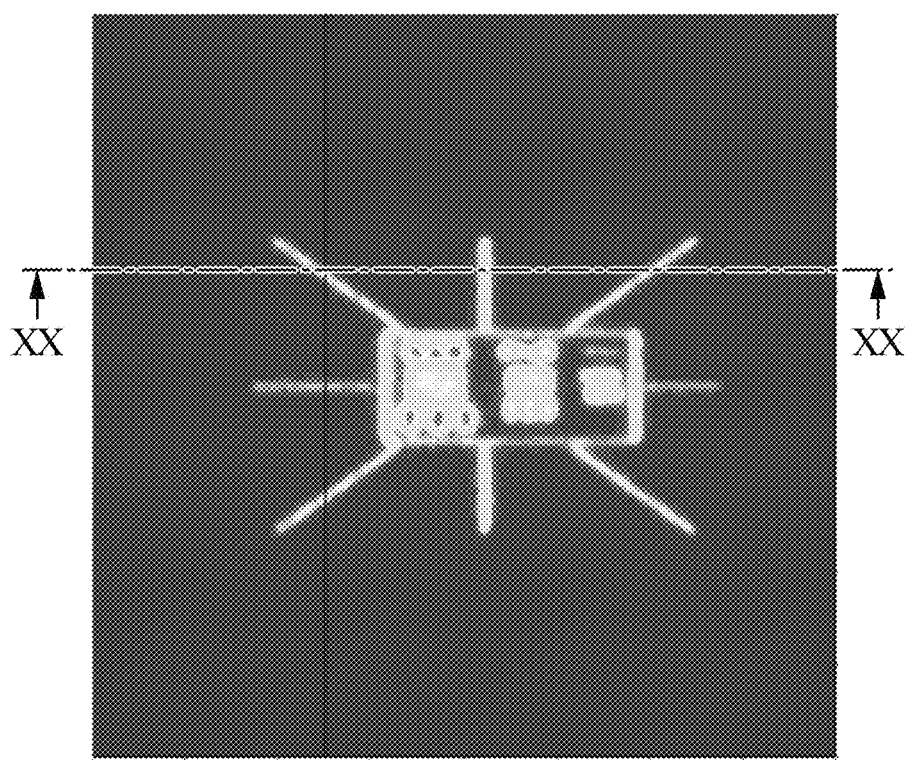
FIG. 19 is a photograph illustrating simulation results of an image.
Figure 20:
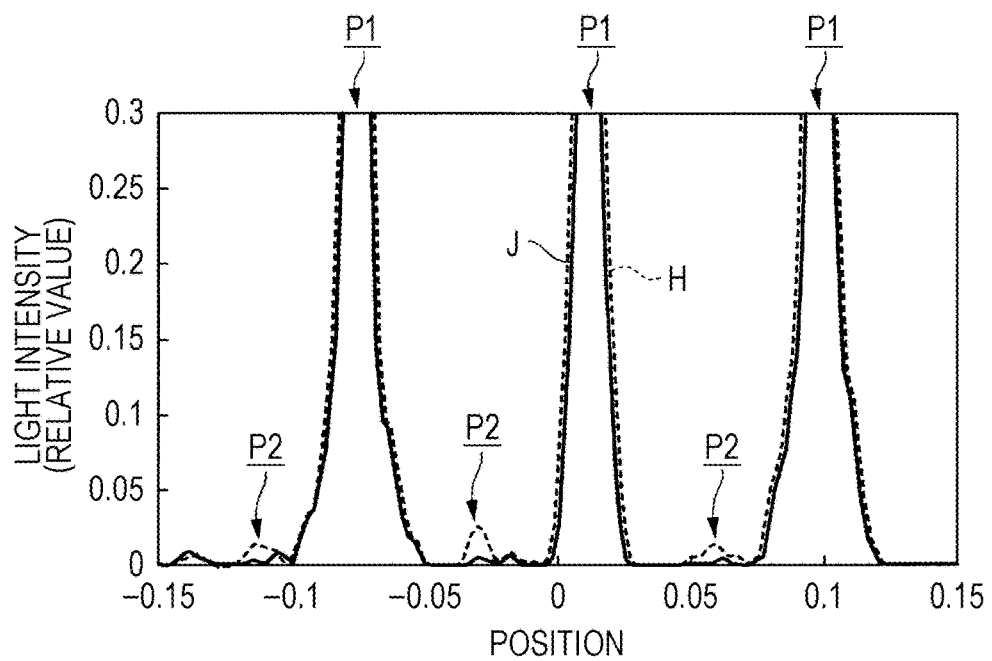
FIG. 20 is a diagram illustrating a light intensity profile along line XX-XX of FIG. 19.

FIG. 19 is a photograph illustrating an example of an image that is a simulation result. FIG. 20 is a diagram illustrating a light intensity profile at respective positions along line XX-XX of FIG. 19. In FIG. 20, the graph of a symbol H indicates a case where the optical element 130 in the related art is used, and the graph of a symbol J indicates a case where the optical element 30 according to the present embodiment is used.

In the graphs of the symbol H and the symbol J illustrated in FIG. 20, three large peaks P1 appear in correspondence with three bright linear portions of the image illustrated FIG. 19. In addition, in a case where the optical element 130 in the related art is used, a small peak P2 appears on the left side of the three large peaks P1. The small light intensity peak P2 appears to an observer as a ghost. In contrast to this, in a case where the optical element 30 according to the present embodiment is used, the small peak P2 is very small. As such, according to the optical element 30 of the present embodiment, there is little possibility that the ghost is viewed.

Third Operation and Effects of Optical Element

Hereinafter, a third operation and effects of the optical element 30 according to the present embodiment will be described.

Figure 21:
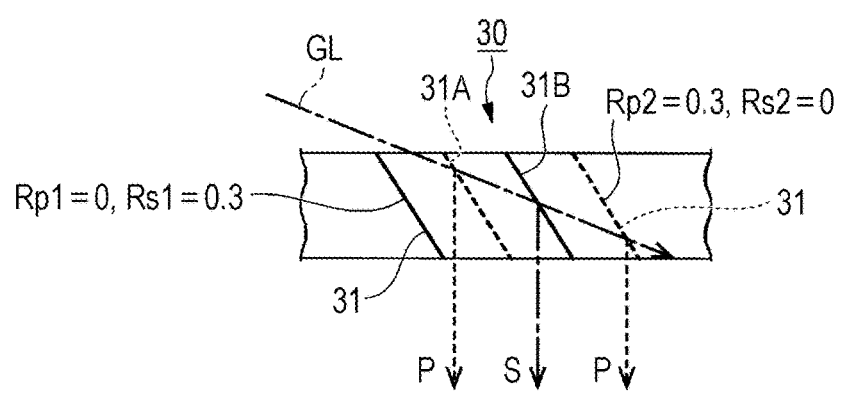
FIG. 21 is a view illustrating still another operation of the optical element according to the embodiment.

FIG. 21 is a view illustrating the third operation of the optical element 30 according to the present embodiment.

In the optical element 130 in the related art, since the same polarized light components included in the image light GL are reflected by the adjacent partially reflecting mirror 131, the same polarized light components reflected by the adjacent partially reflecting mirror 131 are diffracted, and there is a concern that a resolution of the image is lowered.

In order to solve the problem, in the optical element 30 according to the present embodiment, the same polarized light components included in the image light GL are not reflected by the adjacent partially reflecting mirror 31, that is, the first partially reflecting mirror 31A and the second partially reflecting mirror 31B, and are reflected by every other partially reflecting mirror 31, that is, any one of the first partially reflecting mirror 31A and the second partially reflecting mirror 31B, as illustrated in FIG. 21. Accordingly, in the optical element 30 according to the present embodiment, an interval between the reflected lights is approximately twice as large as the reflected light of the optical element 130 in the related art. As a result, a diffraction angle becomes approximately ½ when the polarized light components are diffracted. Thereby, according to the optical element 30 of the present embodiment, it is possible to suppress a decrease in the resolution of the image.

Since the display device 100 according to the present embodiment includes the exit portion 23 including the optical element 30 described above, it is possible to reduce viewing of striped unevenness of the display image and to reduce the external image which is dually viewed. In addition, since the exit portion 23 is provided on the viewing side surface of the parallel light-guide body 22, it is possible to realize the display device 100 that is easily designed.

The technical scope of the disclosure is not limited to the aforementioned embodiments, and various modifications can be made in a range without departing from the gist of the disclosure.

For example, in the aforementioned embodiments, an example is illustrated in which the first partially reflecting mirror and the second partially reflecting mirror having different reflection characteristics with respect to specific polarized light components are alternately arranged over all the partially reflecting mirrors configuring the optical element, but, instead of the configuration, for example, only partially reflecting mirrors in a partial region of the optical element may be configured such that the first partially reflecting mirror and the second partially reflecting mirror are alternately arranged. Alternatively, instead of a configuration in which the first partially reflecting mirror and the second partially reflecting mirror are alternately arranged one by one, a configuration in which a plurality of first partially reflecting mirrors and a plurality of second partially reflecting mirrors are alternately arranged may be provided, and a configuration in which the first partially reflecting mirror and the second partially reflecting mirror are randomly mixed may be provided. Alternatively, the optical element may further include partially reflecting mirrors having a reflectance with respect to a predetermined polarized light component different from the reflectance of the first partially reflecting mirror and different from the reflectance of the second partially reflecting mirror.

Besides, specific configurations of each portion such as the number, shapes, materials, and the like of each configuration element included in the optical element and the display device are not limited to the above embodiments, and can be appropriately changed. For example, a liquid crystal display element, a combination of a laser light source and a MEMS scanner, or the like may be used as an image forming device in addition to the aforementioned organic EL element. In a case where a liquid crystal display element or a laser light source is used as the image forming device, light exited from the image forming device is sometimes one type of polarized light, but, in this case, optical arrangement may be used in which P-polarized light and S-polarized light are mixed. For example, if a transmission axis of an exit side polarizing plate is disposed at an angle between a direction of P-polarization and a direction of S-polarization, it is possible to adjust an intensity ratio of P-polarized light to S-polarized light which are exited from the display element at the angle. Accordingly, if a reciprocal number of the intensity ratio is applied to a reflectance ratio with respect to different polarizations of the first partially reflecting mirror and the second partially reflecting mirror, a good display image is obtained. For example, if a direction of a transmission axis of a polarization plate is 45 degrees, the intensity ratio of the P-polarized light to the S-polarized light is 1:1, and thereby, the S-polarized light reflectance Rs1 of the first partially reflecting mirror and the P-polarized light reflectance Rp2 of the second partially reflecting mirror may be 1:1.

The entire disclosure of Japanese Patent Application No. 2016-183847, filed Sep. 21, 2016 is expressly incorporated by reference herein.

What is claimed is:

1. An optical element comprising:
a plurality of partially reflecting mirrors that are provided in parallel to each other with an interval therebetween, reflect a part of image light and external light, and transmit another part of the image light and the external light; and
a light-transmissive member that is interposed between adjacent two partially reflecting mirrors of the plurality of partially reflecting mirrors,
wherein the light-transmissive member includes an incidence surface on which the image light and the external light are incident and an exit surface from which the image light and the external light are exited,
wherein each of the plurality of partially reflecting mirrors is disposed so as to be inclined with respect to the incidence surface and the exit surface,
wherein the plurality of partially reflecting mirrors include a first partially reflecting mirror, a second partially reflecting mirror and a third partially reflecting mirror, and
wherein, an average value of a reflectance of S-polarized light components with respect to one of the partially reflecting mirrors and a reflectance of P-polarized light components with respect to the one of the partially reflecting mirrors is taken as an average reflectance, the first partially reflecting mirror has the reflectance of the S-polarized light components higher than the average reflectance and the reflectance of the P-polarized light components lower than the average reflectance, the second partially reflecting mirror has the reflectance of the S-polarized light components lower than the average reflectance and the reflectance of the P-polarized light components higher than the average reflectance, and the third partially reflecting mirror has the reflectance of the S-polarized light components higher than the average reflectance and the reflectance of the P-polarized light components lower than the average reflectance.

2. The optical element according to claim 1,
wherein the plurality of partially reflecting mirrors include a plurality of the first partially reflecting mirrors and a plurality of the second partially reflecting mirrors, and
wherein the first partially reflecting mirror and the second partially reflecting mirror are alternately arranged in an arrangement direction of the plurality of partially reflecting mirrors.

3. A display device comprising:
an image forming device; and
a light guiding device that guides image light that is generated by the image forming device,
wherein the light guiding device includes an incidence portion on which the image light is incident, a light guiding body that guides the image light which is incident from the incidence portion, and an exit portion from which the image light is exited, and
wherein the exit portion includes the optical element according to claim 2.

4. The display device according to claim 3, wherein the exit portion is provided on a surface on a viewing side of the light guiding body.

5. A display device comprising:
an image forming device; and
a light guiding device that guides image light that is generated by the image forming device,
wherein the light guiding device includes an incidence portion on which the image light is incident, a light guiding body that guides the image light which is incident from the incidence portion, and an exit portion from which the image light is exited, and
wherein the exit portion includes the optical element according to claim 1.

6. The display device according to claim 5, wherein the exit portion is provided on a surface on a viewing side of the light guiding body.

7. The optical element according to claim 1,
wherein the plurality of partially reflecting mirrors include a fourth partially reflecting mirror, and
wherein the fourth partially reflecting mirror has the reflectance of the S-polarized light components lower than the average reflectance and the reflectance of the P-polarized light components higher than the average reflectance.

* * * * *